United States Patent
Blocksome et al.

(10) Patent No.: US 8,296,430 B2
(45) Date of Patent: Oct. 23, 2012

(54) ADMINISTERING AN EPOCH INITIATED FOR REMOTE MEMORY ACCESS

(75) Inventors: Michael A. Blocksome, Rochester, MN (US); Douglas R. Miller, Albert Lea, MN (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 11/764,333

(22) Filed: Jun. 18, 2007

(65) Prior Publication Data

US 2008/0313661 A1    Dec. 18, 2008

(51) Int. Cl.
- G06F 15/173 (2006.01)
- G06F 3/00 (2006.01)
- G06F 15/16 (2006.01)
- G06F 13/00 (2006.01)
- G06F 13/28 (2006.01)

(52) U.S. Cl. ........ 709/225; 709/201; 709/219; 711/143; 711/147; 711/152; 719/330

(58) Field of Classification Search .................. 709/201, 709/212–219, 225; 719/330; 711/143, 147–152
See application file for complete search history.

(56) References Cited

U.S. PATENT DOCUMENTS

| | | | |
|---|---|---|---|
| 4,860,201 A | 8/1989 | Stolfo et al. |
| 4,910,669 A | 3/1990 | Gorin et al. |
| 5,063,562 A | 11/1991 | Barzilai et al. |
| 5,095,444 A | 3/1992 | Motles |
| 5,491,691 A | 2/1996 | Shtayer et al. |
| 5,651,099 A | 7/1997 | Konsella |
| 5,815,793 A | 9/1998 | Ferguson |
| 5,826,262 A | 10/1998 | Bui et al. |
| 5,826,265 A | 10/1998 | Van Huben et al. |
| 5,859,981 A | 1/1999 | Levin et al. |
| 5,862,381 A | 1/1999 | Advani et al. |
| 5,875,190 A | 2/1999 | Law |
| 5,912,893 A | 6/1999 | Rolfe et al. |
| 5,918,020 A | 6/1999 | Blackard et al. |
| 5,937,201 A | 8/1999 | Matsushita et al. |
| 5,953,336 A | 9/1999 | Moore et al. |
| 5,982,771 A | 11/1999 | Caldara et al. |
| 5,999,734 A | 12/1999 | Willis et al. |
| 6,006,032 A | 12/1999 | Blandy et al. |
| 6,047,122 A | 4/2000 | Spiller |
| 6,057,839 A | 5/2000 | Advani et al. |
| 6,101,495 A | 8/2000 | Tsuchida et al. |

(Continued)

OTHER PUBLICATIONS

Su Huang et al., DZM: MPI One-sided Exploitation of LAPI API's Component Design, Communication Protocols & Application Tools Development, Mar. 16, 2006, IBM Corporation Poughkeepsie, NY.*

(Continued)

*Primary Examiner* — Wing Chan
*Assistant Examiner* — David X Yi
(74) *Attorney, Agent, or Firm* — Biggers & Ohanian, LLP

(57) ABSTRACT

Methods, systems, and products are disclosed for administering an epoch initiated for remote memory access that include: initiating, by an origin application messaging module on an origin compute node, one or more data transfers to a target compute node for the epoch; initiating, by the origin application messaging module after initiating the data transfers, a closing stage for the epoch, including rejecting any new data transfers after initiating the closing stage for the epoch; determining, by the origin application messaging module, whether the data transfers have completed; and closing, by the origin application messaging module, the epoch if the data transfers have completed.

15 Claims, 10 Drawing Sheets

U.S. PATENT DOCUMENTS

| | | | |
|---|---|---|---|
| 6,115,357 | A | 9/2000 | Packer et al. |
| 6,118,777 | A | 9/2000 | Sylvain |
| 6,126,331 | A | 10/2000 | Komatsu et al. |
| 6,167,490 | A * | 12/2000 | Levy et al. ............ 711/148 |
| 6,253,372 | B1 | 6/2001 | Komatsu et al. |
| 6,336,143 | B1 | 1/2002 | Diedrich et al. |
| 6,438,702 | B1 | 8/2002 | Hodge |
| 6,490,566 | B1 | 12/2002 | Schmidt |
| 6,493,637 | B1 | 12/2002 | Steeg |
| 6,563,823 | B1 | 5/2003 | Przygienda et al. |
| 6,600,721 | B2 | 7/2003 | Edholm |
| 6,633,937 | B2 | 10/2003 | Thomson |
| 6,775,703 | B1 * | 8/2004 | Burns et al. ............ 709/228 |
| 6,836,480 | B2 | 12/2004 | Basso et al. |
| 6,839,829 | B1 | 1/2005 | Daruwalla et al. |
| 6,952,692 | B1 | 10/2005 | Bhattiprolu et al. |
| 7,032,224 | B2 | 4/2006 | Kadakia et al. |
| 7,197,577 | B2 | 3/2007 | Nellitheertha |
| 7,216,217 | B2 | 5/2007 | Hansen et al. |
| 7,301,541 | B2 | 11/2007 | Hansen et al. |
| 7,509,244 | B1 | 3/2009 | Shakeri et al. |
| 7,527,558 | B2 | 5/2009 | Lavoie et al. |
| 7,673,011 | B2 | 3/2010 | Archer et al. |
| 2002/0065930 | A1 | 5/2002 | Rhodes |
| 2003/0021287 | A1 | 1/2003 | Lee et al. |
| 2003/0074142 | A1 | 4/2003 | Steeg |
| 2004/0015494 | A1 | 1/2004 | Basso et al. |
| 2004/0098373 | A1 | 5/2004 | Bayliss et al. |
| 2004/0111398 | A1 | 6/2004 | England et al. |
| 2005/0060462 | A1 | 3/2005 | Ota |
| 2005/0182834 | A1 | 8/2005 | Black |
| 2006/0059196 | A1 | 3/2006 | Sato et al. |
| 2006/0203739 | A1 | 9/2006 | Padmanab han et al. |
| 2006/0292292 | A1 | 12/2006 | Brightman et al. |
| 2007/0016589 | A1 | 1/2007 | Hara et al. |
| 2007/0179760 | A1 | 8/2007 | Smith |
| 2008/0109569 | A1 | 5/2008 | Leonard et al. |
| 2008/0126739 | A1 | 5/2008 | Archer et al. |
| 2008/0148355 | A1 | 6/2008 | Archer et al. |
| 2008/0240115 | A1 | 10/2008 | Briscoe et al. |
| 2008/0313376 | A1 | 12/2008 | Archer et al. |
| 2008/0313661 | A1 | 12/2008 | Blocksome et al. |
| 2009/0003344 | A1 | 1/2009 | Kumar |
| 2009/0089328 | A1 | 4/2009 | Miller |
| 2009/0113308 | A1 | 4/2009 | Almasi et al. |
| 2009/0138892 | A1 | 5/2009 | Almasi et al. |

OTHER PUBLICATIONS

Bershad et al. SPIN—An Extensible Microkernel for Application-Specific Operating System Services. ACM SIGOPS Operating System Review. vol. 29, Issue 1 (Jan. 1995). pp. 74-77.

Bershad et al. SPIN—An Extensible Microkernel for Application-Specific Operating System Services. Technical Report Mar. 3, 1994 (Feb. 28, 1994). pp. 1-16. [Retrieved from: http://www-spin.cs.washington.edu/papers/index.html on Nov. 23, 2009].

Hollingworth, D.: Redmond, T.; Rice, R. Security Policy Realization in an Extensible Operating System. Proceedings of DARPA Information Survivability Conference and Exposition. DISCEX '00 (Jan. 25-27, 2000). vol. 1. pp. 320-334.

"Windows Native Processor Performance Control", Windows Platform Design Notes—Designing Hardware for the Microsoft Windows Family of Operating Systems, Nov. 12, 2002.

Office Action Dated Dec. 10, 2009 in U.S. Appl. No. 11/553,040.
Office Action Dated Oct. 3, 2008 in U.S. Appl. No. 11/531,846.
Final Office Action Dated Mar. 2, 2009 in U.S. Appl. No. 11/531,846.
Office Action Dated Jul. 31, 2009 in U.S. Appl. No. 11/531,846.
Office Action Dated Apr. 29, 2009 in U.S. Appl. No. 11/764,282.
Final Office Action Dated Dec. 8, 2009 in U.S. Appl. No. 11/764,282.
Notice of Allowance Dated Oct. 13, 2009 in U.S. Appl. No. 11/837,015.

Chan, Ernie et al. "Collective Communication on Architectures that Support Simultaneous Communication over Multiple Links", PPoPP'06, Mar. 29-31, 2006, New York, New York, USA, pp. 2-11.

Mao, Weizhen et al. "One-To-All Personalized Communication in Torus Networks", Proceedings of the 25$^{th}$ IASTED International Multi-Conference: parallel and distributed computing networks, Innsbruck, Austria, 2007, pp. 291-296.

Almasi, George et al. "Optimization of MPI Collective Communication on BlueGene/L Systems", ICS'05, Jun. 20-22, 2005, Boston, MA, USA, 2005, pp. 253-262.

Moreira, et al.; The Blue Gene/L Supercomputer: A Hardware and Software Story; International Journal of Parallel Programming; Jun. 2007; pp. 181-206; vol. 35, No. 3, Springer Science+Business Media LLC.; USA.

Notice of Allowance Dated Apr. 6, 2010 in U.S. Appl. No. 11/531,846.
Final Office Action Dated Apr. 29, 2010 in U.S. Appl. No. 11/553,040.
Office Action Dated Jul. 12, 2010 in U.S. Appl. No. 11/764,282.
Office Action Dated May 3, 2010 in U.S. Appl. No. 12/180,963.

University of Minnesota Super Computing Institute. 2009. Derived Data Types with MPI.

William Saphir, Message Buffering and It's Effect on the Communications Performance on Parallel Computers. Apr. 1994.

University of Minnesota Super Computing Institute. 2009 MPI Performance Topics.

Final Office Action, U.S. Appl. No. 11/865,981, Jul. 22, 2011.

Nenad Stankovic Kang Zhang, Visual Programming for Message-Passing Systems (1999), International Journal of Software Engineering and Knowledge Engineering.

Matthew J. Sottile, Vaddadi P. Chandu, David A. Bader, Performance analysis of parallel programs via message-passing graph traversal, College of Computing, Georgia Institute of Technology, Feb. 25, 2006.

"MPI-2: Extensions to the Message-Passing Interface," Forum, Nov. 15, 2003.

Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12,166,748, Mar. 7, 2011.
Final Office Action, U.S. Appl. No. 11,832,192, Apr. 13, 2011.
Office Action, U.S. Appl. No. 11/764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.

Willis, "MinSim: Optimized, Compiled VHDL Simulation Using Networked & Parallel Computers", 1993, Proceedings of Fall 1993 VHDL International User's Forumn, pp. 197-144.

Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.

* cited by examiner

ADMINISTERING AN EPOCH INITIATED FOR REMOTE MEMORY ACCESS

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, systems, and products for administering an epoch initiated for remote memory access.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather.

Through such data communications networks, one compute node often performs remote memory access on another compute node. The compute node initiating the remote memory access is referred to as the origin compute node, while the compute node which is accessed remotely is referred to as the target compute node. Remote memory access is typically used to provide passive data synchronization between the origin and the target compute nodes. The synchronization is referred to as 'passive' because the memory access on the target compute node is accomplished using a Direct Memory Access ('DMA') subsystem of the target compute node that requires little or no involvement of the target compute node's processing core or higher level software applications. Synchronization between the origin and the target compute nodes is effected through the establishment of a data transfer epoch. An epoch is a time period during which access limitations are placed on data of the target compute node. At the beginning of the epoch, access limitations are placed on the target compute node's memory. During the epoch, the origin compute node remotely accesses memory on the target compute node, reading from or writing data to the target compute node. At the end of the epoch, the access limitations are removed from the target compute node's memory. Until the epoch ends, the origin compute node typically does not continue processing its application, and the access limitations on the target compute node's memory remain. To close an epoch, all the data transfers between the origin compute node and the target compute node must typically be complete. Advancements for administering such an epoch initiated for remote memory access are described in detail below.

SUMMARY OF THE INVENTION

Methods, systems, and products are disclosed for administering an epoch initiated for remote memory access that include: initiating, by an origin application messaging module on an origin compute node, one or more data transfers to a target compute node for the epoch; initiating, by the origin application messaging module after initiating the data transfers, a closing stage for the epoch, including rejecting any new data transfers after initiating the closing stage for the epoch; determining, by the origin application messaging module, whether the data transfers have completed; and closing, by the origin application messaging module, the epoch if the data transfers have completed.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
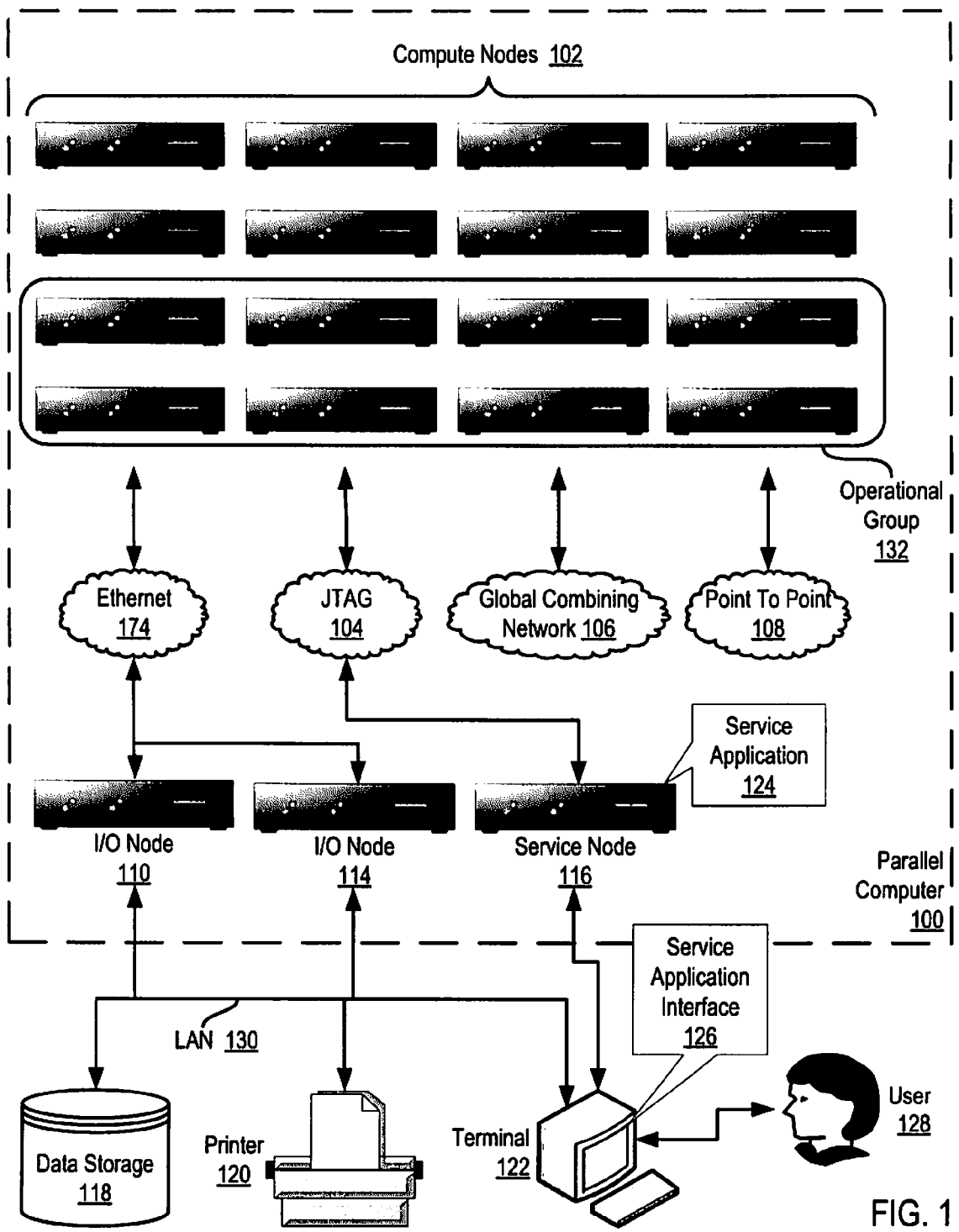
FIG. 1 illustrates an exemplary system for administering an epoch initiated for remote memory access according to embodiments of the present invention.

Exemplary methods, systems, and computer program products for administering an epoch initiated for remote memory access according to embodiments of the present invention are described with reference to the accompanying drawings, beginning with FIG. 1. FIG. 1 illustrates an exemplary system for administering an epoch initiated for remote memory access according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally to for administering an epoch initiated for remote memory access according to embodiments of the present invention. The system of FIG. 1 operates generally to for administering an epoch initiated for remote memory access according to embodiments of the present invention by: initiating, by an origin application messaging module on a origin compute node, one or more data transfers to a target compute node for the epoch; initiating, by the origin application messaging module after initiating the data transfers, a closing stage for the epoch, including rejecting any new data transfers after initiating the closing stage for the epoch; determining, by the origin application messaging module, whether the data transfers have completed; and closing, by the origin application messaging module, the epoch if the data transfers have completed. Readers will note that the compute node initiating the remote memory access using the data transfers is referred to as the origin compute node, while the compute node which is accessed remotely is referred to as the target compute node.

An epoch is a time period during which access limitations are placed on data of the target compute node while the origin compute node performs remote memory access on the target compute node. At the beginning of the epoch, access limitations are placed on the target compute node's memory. During the epoch, the origin compute node remotely accesses memory on the target compute node, reading from or writing data to the target compute node. At the end of the epoch, the access limitations are removed from the target compute node's memory. Until the epoch ends, the origin compute node typically does not continue processing its application, and the access limitations on the target compute node's memory remain. To end the epoch, all the data transfers between the origin compute node and the target compute node must be complete. The closing stage of the epoch is the last portion of the epoch during which no new data transfers are initiated for the epoch. The closing stage of the epoch advantageously provides a period of time at the end of the epoch to allow any data transfers currently in progress to complete before the epoch is closed.

The arrangement of nodes, networks, and I/O devices making up the exemplary system illustrated in FIG. 1 are for explanation only, not for limitation of the present invention. Data processing systems capable of administering an epoch initiated for remote memory access according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of administering an epoch initiated for remote memory access according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Administering an epoch initiated for remote memory access according to embodiments of the present invention may be generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of administering an epoch initiated for remote memory access according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms. The application (158) of FIG. 2 allocates an application buffer for storing a message for transmission to another compute node.

Also stored RAM (156) is an application messaging module (160), a library of computer program instructions that carry out parallel communications among compute nodes, including point to point operations as well as collective operations.

Application program (158) effects data communications with other application running on other compute nodes by calling software routines in the application messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
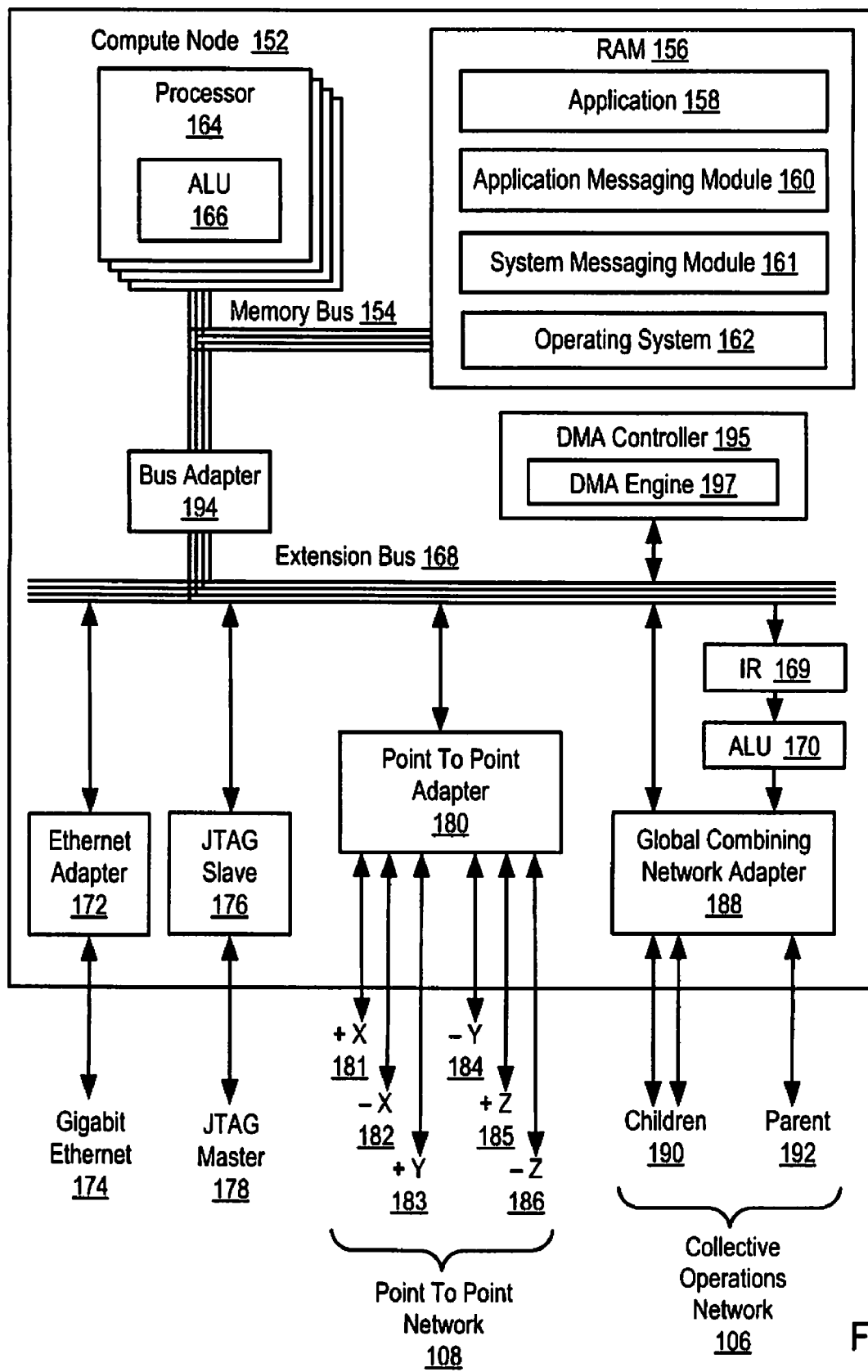
FIG. 2 sets forth a block diagram of an exemplary compute node useful in a parallel computer capable of administering an epoch initiated for remote memory access according to embodiments of the present invention.

In the example of FIG. 2, the application messaging module (160) operates generally for administering an epoch initiated for remote memory access according to embodiments of the present invention. The messaging module (160) of FIG. 2 operates generally for administering an epoch initiated for remote memory access according to embodiments of the present invention by: initiating one or more data transfers to a target compute node for the epoch; initiating, after initiating the data transfers, a closing stage for the epoch, including rejecting any new data transfers after initiating the closing stage for the epoch; determining whether the data transfers have completed; and closing the epoch if the data transfers have completed.

Also stored in RAM (156) is a system messaging module (161) that implements system specific protocols for communications that support messaging for application (158) and the application messaging module (160). Such system specific protocols are typically invoked through a set of APIs that are exposed to the application messaging module (160). Such system specific protocols used for communications in the system messaging module (161) are typically isolated from the application (158) through the application messaging module (160), thus making the interface provided to the application (158) somewhat independent of system specific details implemented in the system messaging module (161). The system messaging module (161) of FIG. 2 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging module (161) typically accesses communications hardware and software useful according to the present invention such as, for example, DMA controller (195), DMA engine (197), and data communications adapters (180, 188).

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for administering an epoch initiated for remote memory access according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in administering an epoch initiated for remote memory access according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (197) and the DMA controller (195) support the system messaging module (161), and thereby the application message module (160), for administering an epoch initiated for remote memory access according to embodiments of the present invention.

Figure 3A:
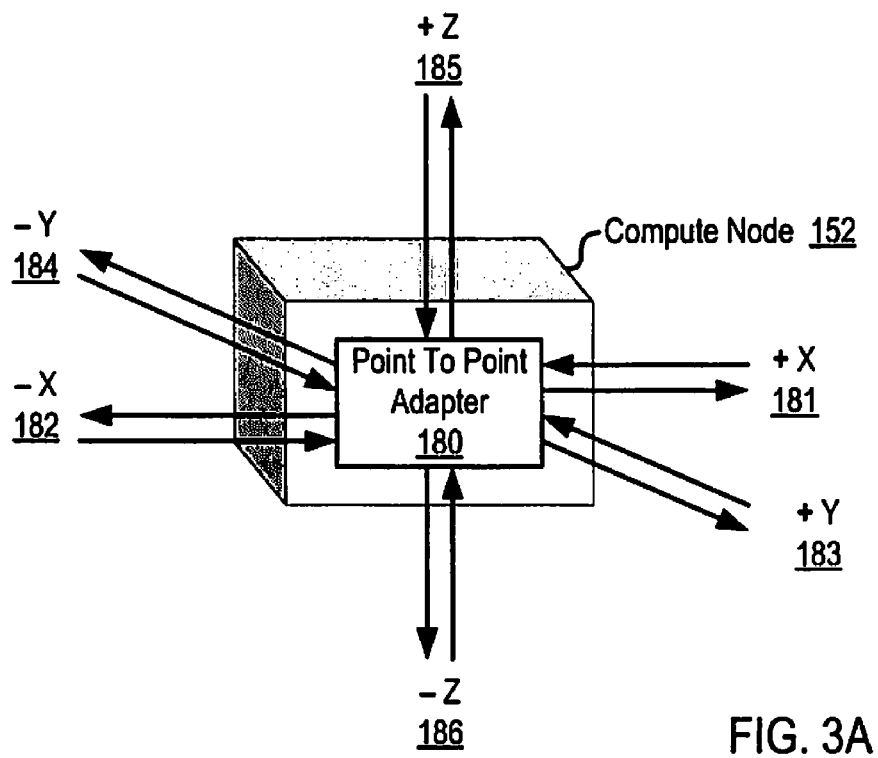
FIG. 3A illustrates an exemplary Point To Point Adapter useful in systems capable of administering an epoch initiated for remote memory access according to embodiments of the present invention.

For further explanation, FIG. 3A illustrates an exemplary Point To Point Adapter (180) useful in systems capable of administering an epoch initiated for remote memory access according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
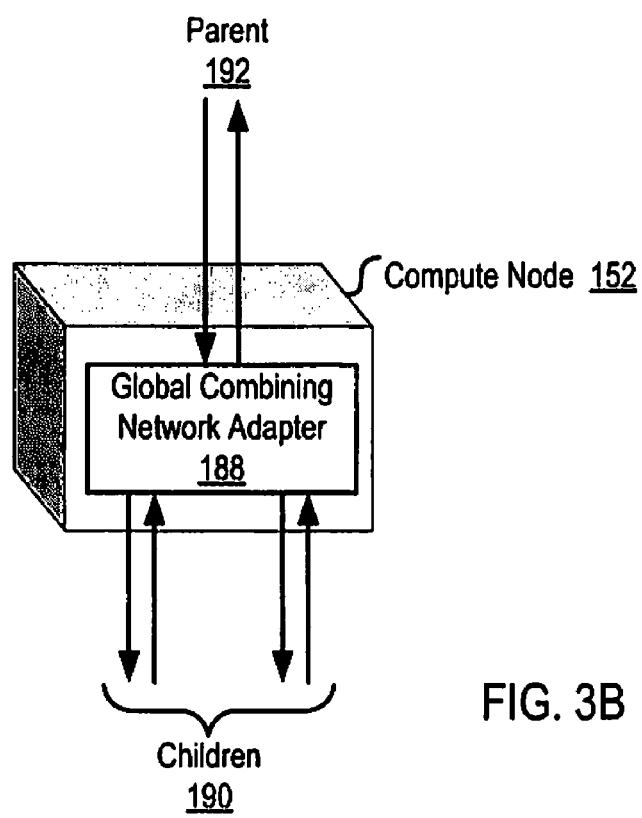
FIG. 3B illustrates an exemplary Global Combining Network Adapter useful in systems capable of administering an epoch initiated for remote memory access according to embodiments of the present invention.

For further explanation, FIG. 3B illustrates an exemplary Global Combining Network Adapter (188) useful in systems capable of administering an epoch initiated for remote memory access according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
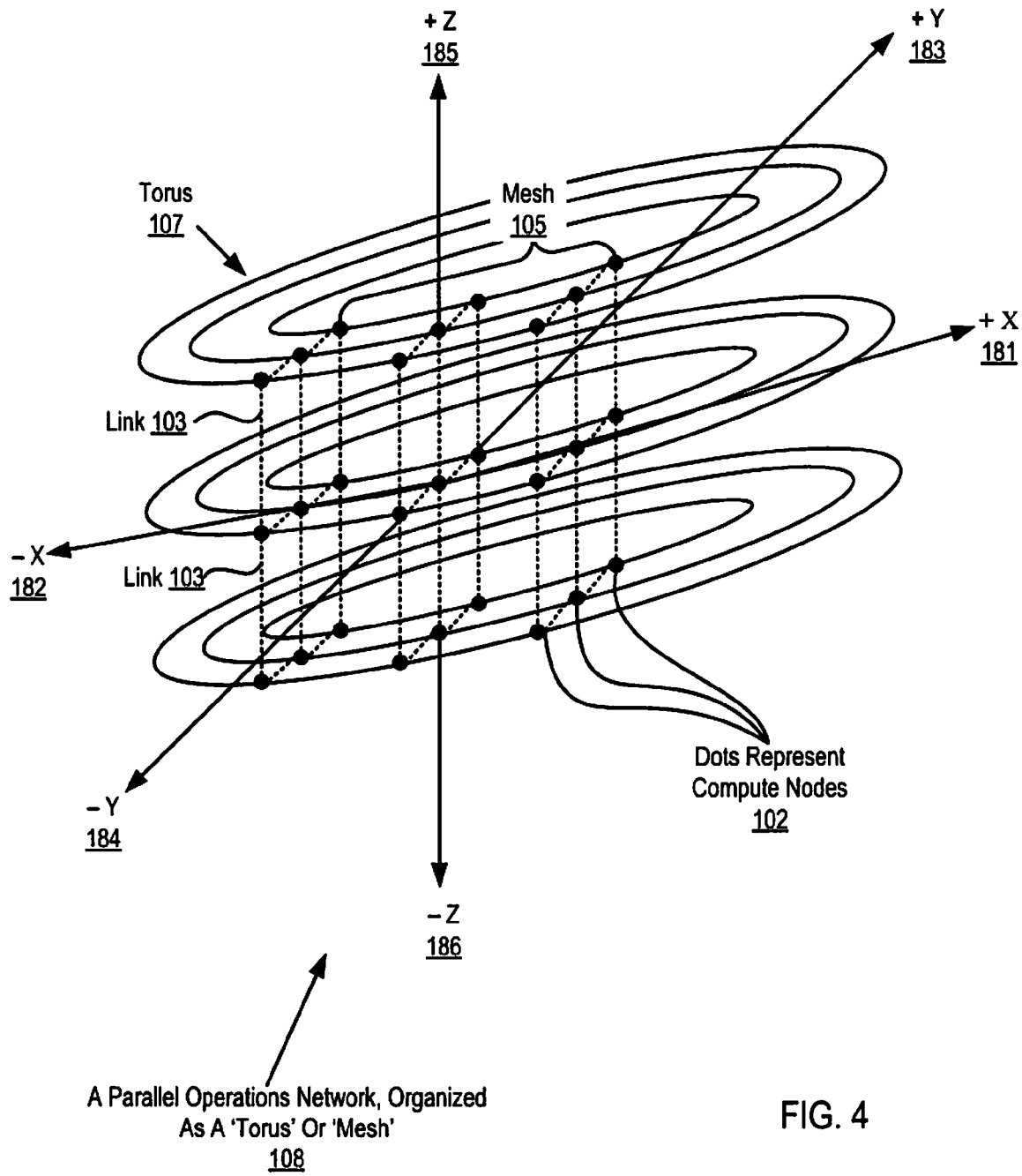
FIG. 4 sets forth a line drawing illustrating an exemplary data communications network optimized for point to point operations useful in systems capable of administering an epoch initiated for remote memory access in accordance with embodiments of the present invention.

For further explanation, FIG. 4 sets forth a line drawing illustrating an exemplary data communications network (108) optimized for point to point operations useful in systems capable of administering an epoch initiated for remote memory access in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in administering an epoch initiated for remote memory access in accordance with embodiments of the present invention may contain only a few compute nodes or may contain thousands of compute nodes.

Figure 5:
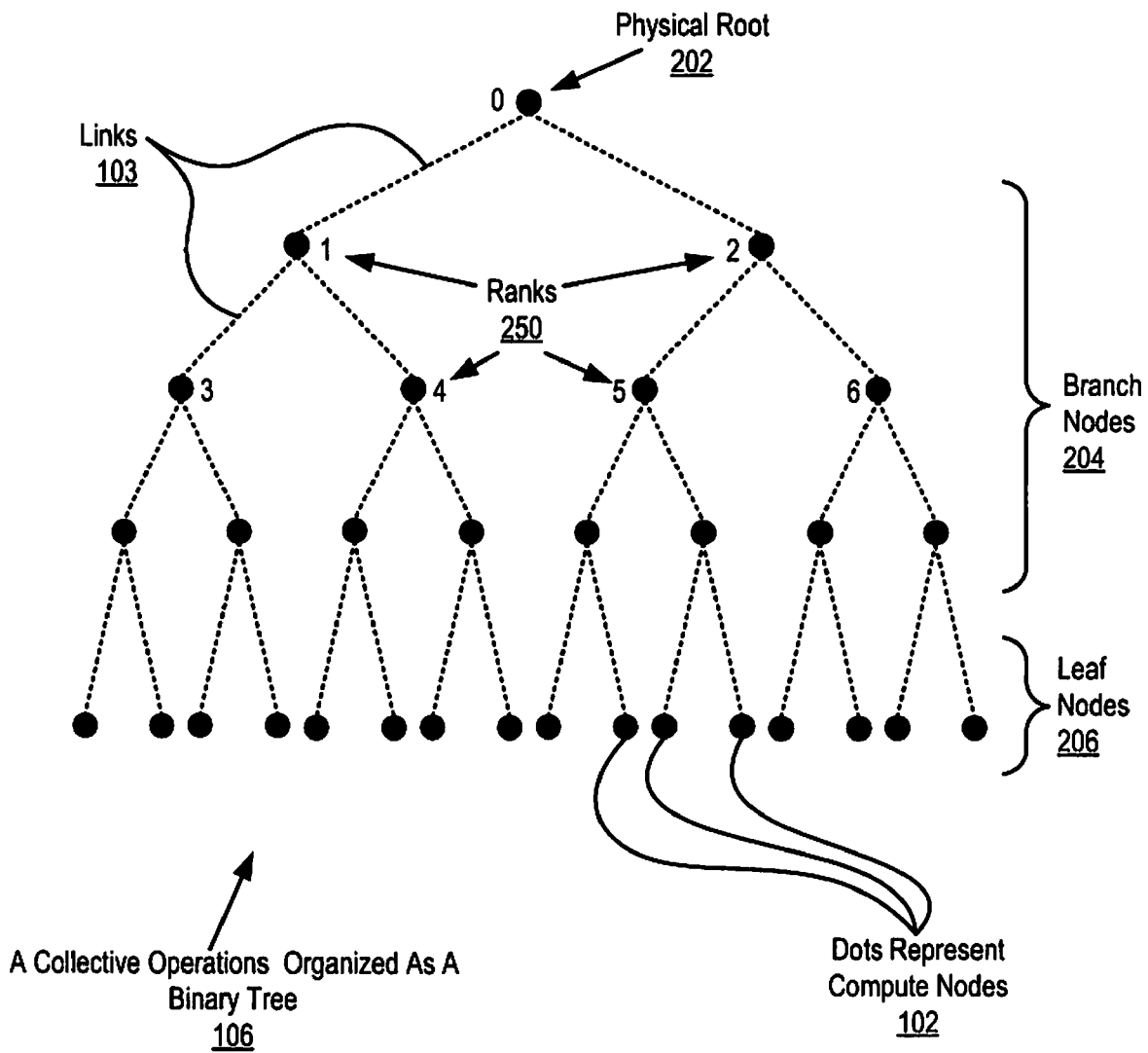
FIG. 5 sets forth a line drawing illustrating an exemplary data communications network optimized for collective operations useful in systems capable of administering an epoch initiated for remote memory access in accordance with embodiments of the present invention.

For further explanation, FIG. 5 sets forth a line drawing illustrating an exemplary data communications network (106) optimized for collective operations useful in systems capable of administering an epoch initiated for remote memory access in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for administering an epoch initiated for remote memory access in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
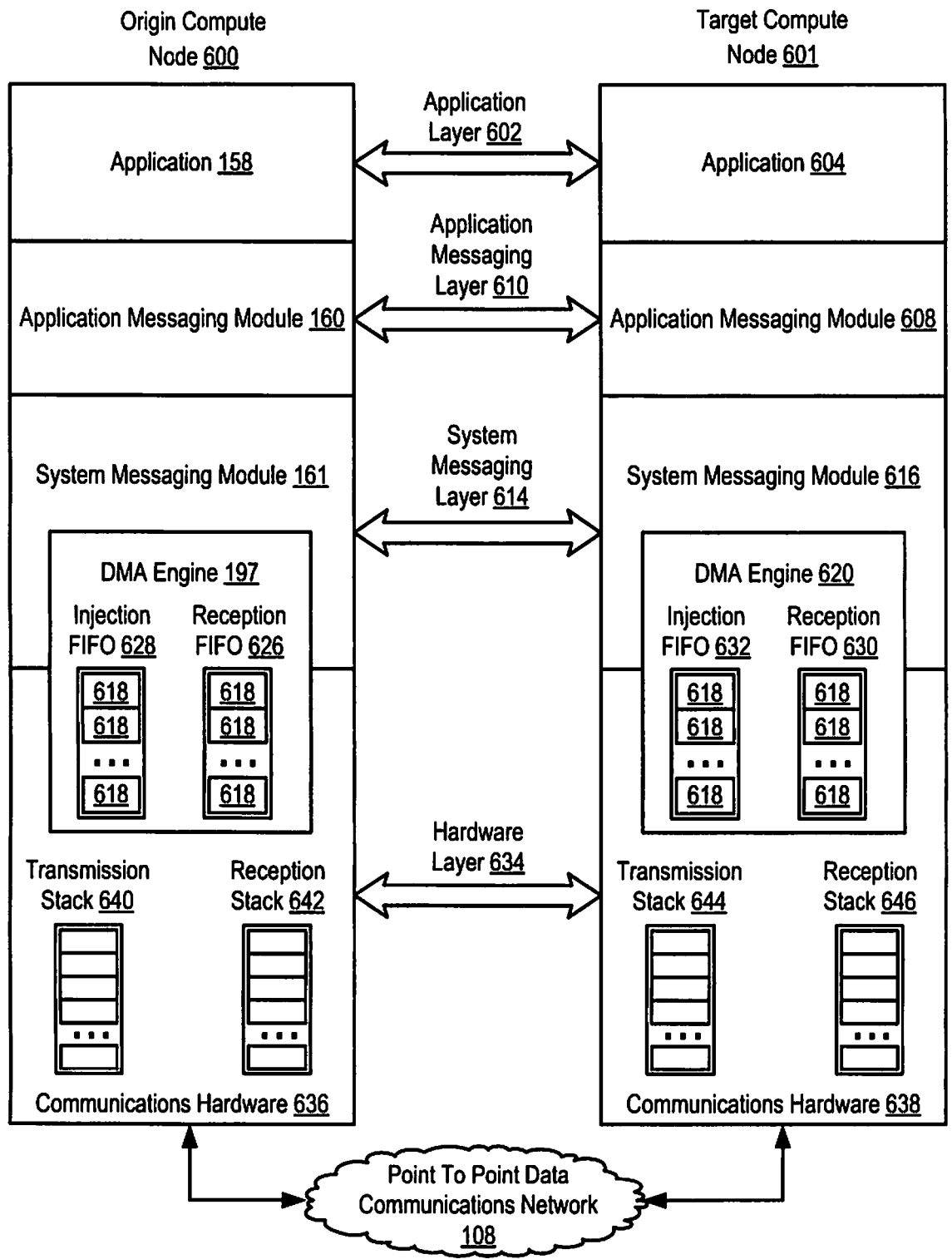
FIG. 6 sets forth a block diagram illustrating an exemplary communications architecture illustrated as a protocol stack useful in administering an epoch initiated for remote memory access according to embodiments of the present invention.

For further explanation, FIG. 6 sets forth a block diagram illustrating an exemplary communications architecture illustrated as a protocol stack useful in administering an epoch initiated for remote memory access according to embodiments of the present invention. The exemplary communications architecture of FIG. 6 sets forth two compute nodes, an origin compute node (600) and a target compute node (601). The example of FIG. 6 only illustrates two compute nodes for ease of explanation and not for limitation. In fact, administering an epoch initiated for remote memory access according to embodiments of the present invention may be implemented using an origin node and any number of target compute nodes as is often the case with very large scale computer systems such as parallel computers with thousands of compute nodes.

The exemplary communications architecture of FIG. 6 includes an application layer (602) composed of application (158) installed on the origin compute node (600) and application (604) installed on the target compute node (601). Data communications between applications (158, 604) are effected using application messaging modules (160, 608) installed on each of the compute nodes (600, 601). Applications (158, 604) may communicate messages by invoking function of an application programming interfaces ('API') exposed by the application messaging modules (160, 608). For the origin compute node's application (158) to transmit messages to the target compute node's application (604), the origin compute node's application (158) typically calls a 'send' messaging function of the application messaging module (160), while the target compute node's application (604) typically calls a 'receive' messaging function of the application messaging module (608). Each application (158, 604) provides match data to their respective application messaging module (160, 608), the origin compute node's application (158) providing origin match data and the target compute node's application (604) providing target match data.

Match data is the data used by the application messaging layer (610) to match the 'send' function called by the origin compute node's application (604) with the 'receive' function called by the target compute node's application (158) so that the data specified in the 'send' function is stored in the location specified in the 'receive' function. Match data may be implemented, for example, as a data structure specifying the origin compute node's unique rank in the operational group, a tag number provided by the application, and a context that identifies the particular operational group of compute nodes involved in the transfer. Match data provided to the origin compute node's application messaging module (608) is referred to as origin match data, while the match data provided to the target compute node's application messaging module (160) is referred to as target match data.

The exemplary communications architecture of FIG. 6 includes an application messaging layer (610) that provides a hardware-independent messaging interface that supports messaging in the application layer (602). Such a messaging interface is typically utilized by applications (158, 604) in the application layer (602) through a set of APIs exposed by application messaging modules. In the example of FIG. 6, the messaging layer (610) is composed of an application messaging module (160) installed on the origin compute node (600) and an application messaging module (608) installed on the target compute node (601).

In the example of FIG. 6, the application messaging module (160) operates for administering an epoch initiated for remote memory access according to embodiments of the present invention. The epoch is typically initiated upon request by the application (158) on the origin compute node (600) through the API of the application message module (160). The application creates a unique identifier for the epoch and provides the identifier to the application messaging module (160) along with the rank of the target compute node (601) involved in the synchronization. The application messaging module (160) initiates one or more data transfers to the target compute node (601) for the epoch. After initiating the data transfers, the application messaging module (160) initiates a closing stage for the epoch. As mentioned above, the closing stage of the epoch is the last portion of the epoch during which no new data transfers are initiated for the epoch. The closing stage of the epoch advantageously provides a period of time at the end of the epoch to allow any data transfers currently in progress to complete before the epoch is closed. After initiating the closing stage for the epoch, the application messaging module (160) rejects any new data transfers and determines whether the previously initiated data transfers have completed. The application messaging module (160) then closes the epoch if the data transfers have completed.

The exemplary communications architecture of FIG. 6 includes a system messaging layer (614) that implements hardware-specific protocols for communications that support messaging in the application layer (602) and the application messaging layer (610). Such system specific protocols are typically invoked through a set of APIs that are exposed to the application messaging layer (610). Such system specific protocols used for communications in the system messaging layer (614) are typically isolated from the application layer (602) through the application messaging layer (610), thus making the interface provided to the application layer (602) somewhat independent of system-specific details implemented in the system messaging layer (614). In the example of FIG. 6, the system messaging layer (614) is composed of a system messaging module (161) installed on the origin compute node (600) and a system messaging module (616) installed on the target compute node (601).

The system messaging layer (614) of FIG. 6 implements system specific communications protocols using a set of messaging primitives. A messaging primitive is a data communications operation that serves as a basic building block for communicating between compute nodes. A message primitive may be implemented as, for example, a request to send ('RTS') operation that send a RTS control message to a compute node, a clear to send ('CTS') operation that sends a CTS control message to a compute node, a remote get operation that transfers data from one compute node to another, a memory FIFO operation that transfers data from one compute node to another, an acknowledgement operation that sends an acknowledgement message to a compute node, and so on. Combining a number of messaging primitives together forms the basis for developing a communications protocol. In carrying out system specific communications protocols, the system messaging layer (614) typically accesses communications hardware and software useful according to the present invention such as, for example, DMA controllers, DMA engines, data communications hardware, and so on.

The exemplary communications architecture of FIG. 6 also includes a hardware layer (634) that defines the physical implementation and the electrical implementation of aspects of the hardware on the compute nodes such as the bus, network cabling, connector types, physical data rates, data transmission encoding and may other factors for communications between the compute nodes (600 and 601) on the physical network medium. The hardware layer (634) of FIG. 6 is composed of communications hardware (636) of the origin compute node (600), communications hardware (638) of the target compute node (601), and the data communications network (108) connecting the origin compute node (600) to the target compute node (601). Such communications hardware may include, for example, point-to-point adapters and DMA controllers as described above with reference to FIGS. 2 and 3A. In the example of FIG. 6, the communications hardware (636 and 638) each include a transmission stack (640 and 644) for storing network packets for transmission to other communications hardware through the data communications network (108), and each include a reception stack (642 and 646) for storing network packets received from other communications hardware through the data communications network (108).

The exemplary communications architecture of FIG. 6 illustrates a DMA engine (197) for the origin compute node (600) and a DMA engine (620) for the target compute node (601). The DMA engines (197 and 620) in the example of FIG. 6 are illustrated in both the system messaging layer (614) and the hardware layer (634). The DMA engines (197 and 620) are shown in both the system messaging layer (614) and the hardware layer (634) because a DMA engine useful in embodiments of the present invention may often provide system messaging layer interfaces and also implement communications according to some aspects of the communication hardware layer (634). The exemplary DMA engines (197 and 620) of FIG. 6 each include an injection FIFO buffer (628 and 632) for storing data descriptors (618) for messages to be sent to other DMA engines on other compute nodes using a memory FIFO data transfer operation or direct put data transfer operation. The exemplary DMA engines (197 and 620) of FIG. 6 each also include a reception FIFO buffer (626 and 630) for storing data descriptors (618) for messages received from other DMA engines on other compute nodes. Although FIG. 6 only illustrates a single injection FIFO buffer and a single reception FIFO buffer, readers will note that a DMA engine may have access to any number of injection FIFO buffers and reception FIFO buffers for carrying out data transfers from an origin compute node to a target compute node according to embodiments of the present invention.

A memory FIFO data transfer operation is a mode of transferring data using a DMA engine on an origin node and a DMA engine on a target node. In a memory FIFO data transfer operation, data is transferred along with a data descriptor describing the data from an injection FIFO for the origin DMA engine to a target DMA engine. The target DMA engine in turns places the descriptor in the reception FIFO and caches the data. A core processor then retrieves the data descriptor from the reception FIFO and processes the data in cache either by instructing the DMA to store the data directly or carrying out some processing on the data, such as even storing the data by the core processor.

A direct put operation is a mode of transferring data using a DMA engine on an origin node and a DMA engine on a target node. A direct put operation allows data to be transferred and stored on the target compute node with little or no involvement from the target node's processor. To effect minimal involvement from the target node's processor in the direct put operation, the origin DMA transfers the data to be stored on the target compute node along with a specific identification of a storage location on the target compute node. The origin DMA knows the specific storage location on the target compute node because the specific storage location for storing the data on the target compute node has been previously provided by the target DMA to the origin DMA.

Figure 7:
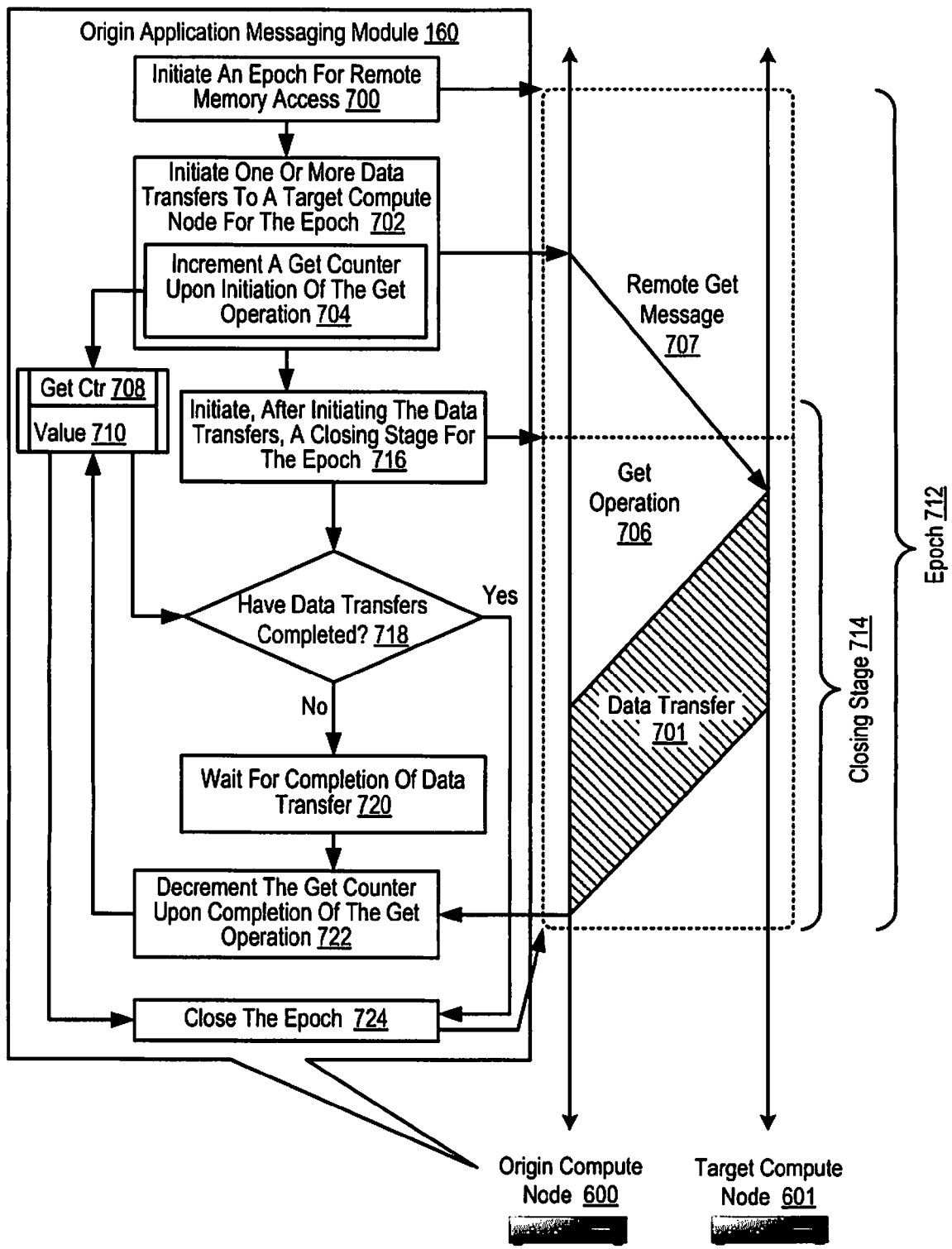
FIG. 7 sets forth a flow chart illustrating an exemplary method for administering an epoch initiated for remote memory access according to the present invention.

For further explanation, FIG. 7 sets forth a flow chart illustrating an exemplary method for administering an epoch initiated for remote memory access according to the present invention. The example of FIG. 7 includes an origin compute node (600) and a target compute node (601). The origin compute node (600) of FIG. 7 has installed upon it an origin application messaging module (160) capable of carry out the method for administering an epoch initiated for remote memory access according to the present invention.

The method of FIG. 7 includes initiating (700), by the origin messaging module (160), an epoch (712) for remote memory access. The origin messaging module (160) initiates (700) the epoch (712) for remote memory access according to the method of FIG. 7 in response to receiving a request from an application on the origin compute node (600) through an API exposed by the origin messaging module (160). Through the API, the application may provide the origin messaging module (160) with an identifier for the epoch (712), which the origin messaging module (160) combines with the rank of the origin compute node (600) to uniquely identify the epoch (712) in the operational group for the compute nodes (600 and 601). In addition to providing an epoch identifier, the application also provides the origin messaging module (160) with the rank of the target compute node (601) included in the epoch (712). In the method of FIG. 7, the origin messaging module (160) may initiate (700) an epoch (712) for remote memory access by sending an epoch initialization message to the target compute node (601) that instructs the target compute node (601) to place access limitations on the target compute node's memory.

The method of FIG. 7 also includes initiating (702), by an origin application messaging module (160) on an origin compute node (600), one or more data transfers (701) to a target compute node (601) for the epoch (712). Readers will note that FIG. 7 only illustrates one data transfer for explanation and clarity. However, any number of data transfers may be initiated before initiating the closing stage (714) for the epoch (712) according to embodiments of the present invention. The data transfer (701) of FIG. 7 retrieves data from the target compute node (601) and stores the data on the origin compute node (600). In the example of FIG. 7, the data transfer (701) is effected using a get operation (706). A get operation (706) is a DMA-assisted data transfer operation that allows an origin compute node to retrieve data from a target compute node with minimal involvement from the processor on the target compute node providing the data. The origin application messaging module (160) may initiate (702) the transfer (701) to a target compute node (601) for the epoch (712) according to the method of FIG. 7 by sending a remote get message (707) to the target compute node (601). The remote get message (707) of FIG. 7 typically specifies the location on the target compute node (601) where the data to be transferred is stored and specifies where the transferred data may be stored on the origin compute node (600) by origin compute node's DMA engine as the data arrives on the origin compute node (600). Upon receiving the remote get message (707), a DMA engine on the target compute node (601) begins the data transfer (701) by reading the data from storage on the target compute node (601), packetizing the data into network packets and transmitting the data through a data communication network to the origin compute node (600).

In the method of FIG. 7, initiating (702), by the origin application messaging module (160) on an origin compute node (600), one or more data transfers (701) to a target compute node (601) for the epoch (712) includes incrementing (704) a get counter (708) upon initiation of the get operation (706) for each data transfer (701). The get counter (708) is a counter that keeps track of how many data transfers are currently in progress to the target compute node (601) for the epoch (712). In the example of FIG. 7, the get counter (708) keeps track of how many data transfers are currently in progress to the target compute node (601) for the epoch (712) using a value (710).

The method of FIG. 7 also includes initiating (716), by the origin application messaging module (160) after initiating the data transfers (701), a closing stage (714) for the epoch (712), including rejecting any new data transfers after initiating the closing stage (714) for the epoch (712). The closing stage (714) of the epoch (712) is the last portion of the epoch (712) during which no new data transfers are initiated for the epoch (712). The closing stage (714) of the epoch (712) advantageously provides a period of time at the end of the epoch (712) to allow any data transfers currently in progress to complete before the epoch (712) is closed. In the method of FIG. 7, the origin application messaging module (160) initiates (716) the closing stage (714) for the epoch (712) before the data transfer (701) is complete.

The method of FIG. 7 includes determining (718), by the origin application messaging module (160), whether the data transfers (701) have completed. The origin application messaging module (160) may determine (718) whether the data transfers (701) have completed according to the method of FIG. 7 by determining whether the value (710) of the get counter (708) is zero. If the value (710) of the get counter (708) is zero, then the data transfer (701) has completed because a value of zero indicates that there are not data transfer currently in progress for the epoch (712). If the value (710) of the get counter (708) is not zero, then the data transfer (701) has not completed because a non-zero value indicates that data transfer are currently in progress for the epoch (712).

The method of FIG. 7 includes waiting (720), by the origin application messaging module (160), for completion of the data transfer (701) if the data transfer (701) has not been completed. The origin application messaging module (160) may wait (720) for completion of the data transfer (701) according to the method of FIG. 7 by listening for a transfer completion signal from the DMA engine of the origin compute node (600) indicating that a data transfer for the epoch (712) is complete.

The method of FIG. 7 also includes decrementing (722), by the origin application messaging module (160), the get counter (708) upon completion of each get operation (706). The origin application messaging module (160) may decrement (722) the get counter (708) upon completion of each get operation (706) according to the method of FIG. 7 after receiving transfer completion signal from the DMA engine of the origin compute node (600) indicating that a data transfer for the epoch (712) is complete. After decrementing (722) the get counter (708), the method of FIG. 7 again determines (718) whether the data transfers (701) have completed as described above.

The method of FIG. 7 includes closing (724), by the origin application messaging module (160), the epoch (712) if the data transfers (701) have completed. The origin application messaging module (160) may close (724) the epoch (712) according to the method of FIG. 7 by sending an epoch termination message to the target compute node (601) that instructs the target compute node (601) to remove any access limitations on the target compute node's memory and by returning processor control to the origin compute node's application requesting the synchronization with the target compute node (601).

As mentioned above, the application messaging module (160) initiates (716) a closing stage (714) for an epoch (712) before the data transfer (701) is completed in the example of FIG. 7. Because there are pending data transfers for the epoch (712) when the closing stage (714) is initiated, the duration of the closing stage (714) is at least as long as the time taken to complete any remaining data transfers. Upon completion of the remaining data transfers, the application messaging module (160) of FIG. 7 may close (724) epoch (712).

In FIG. 7, the origin application messaging module initiates a closing stage for an epoch before all of the data transfers initiated for the epoch are complete. In some embodiments, however, the origin application messaging module may initiate a closing stage for an epoch after all of the data transfers initiated for the epoch are complete. For further explanation, therefore, FIG. 8 sets forth a flow chart illustrating a further exemplary method for administering an epoch initiated for remote memory access according to the present invention in which the origin application messaging module (160) initiates (716) a closing stage (714) for an epoch (712) after the data transfers are complete.

Figure 8:
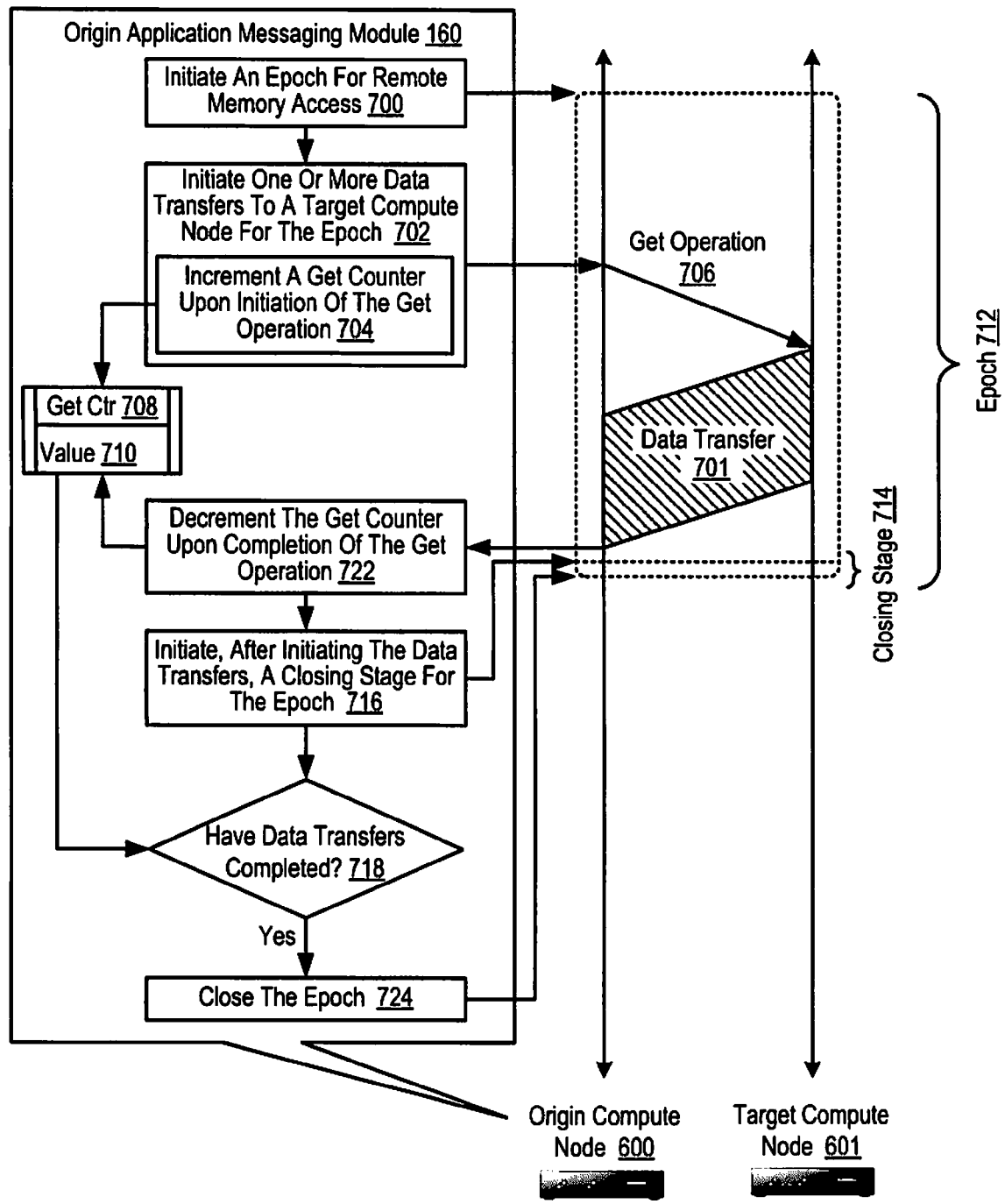
FIG. 8 sets forth a flow chart illustrating a further exemplary method for administering an epoch initiated for remote memory access according to the present invention.

The method of FIG. 8 is similar to the method of FIG. 7. That is, the method of FIG. 8 includes: initiating (700), by the origin messaging module (160), an epoch (712) for remote memory access; initiating (702), by an origin application messaging module (160) on an origin compute node (600), one or more data transfers (701) to a target compute node (601) for the epoch (712), including incrementing (704) a get counter (708) upon initiation of the get operation (706) for each data transfer (701); decrementing (722), by the origin application messaging module (160), the get counter (708) upon completion of each get operation (706); initiating (716), by the origin application messaging module (160) after initiating the data transfer (701), a closing stage (714) for the epoch (712), including rejecting any new data transfers after initiating the closing stage (714) for the epoch (712); determining (718), by the origin application messaging module (160), whether the data transfers (701) have completed; and closing (724), by the origin application messaging module (160), the epoch (712) if the data transfers (701) have completed.

As mentioned above, the application messaging module (160) initiates (716) a closing stage (714) for an epoch (712) after the data transfer (701) is completed in the example of FIG. 8. Because there are no pending data transfer operations for the epoch (712) when the closing stage (714) is initiated, the duration of the closing stage (714) illustrated in FIG. 8 is minimal, and the application messaging module (160) may close (724) epoch (712) shortly after initiating the closing stage (714).

Figure 9:
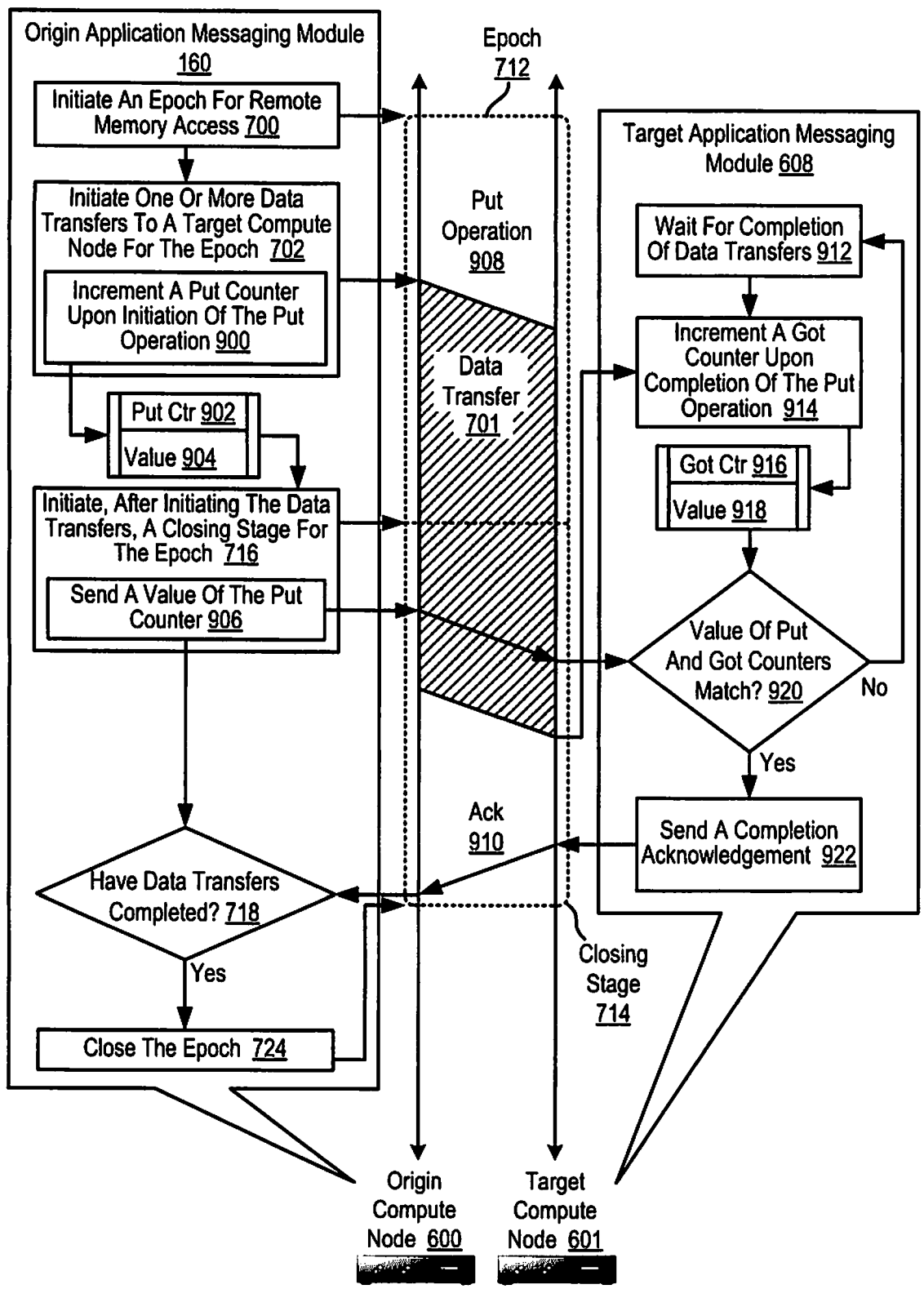
FIG. 9 sets forth a flow chart illustrating a further exemplary method for administering an epoch initiated for remote memory access according to the present invention.

Readers will note that the data transfers described with reference to FIGS. 7 and 8 are effected using get operations that allows an origin compute node to retrieve data from a target compute node. A data transfer, however, may also be effected using a put operation. A put operation is a DMA-assisted transfer operation that allows an origin compute node to store data on a target compute node with minimal involvement from the processor on the target compute node. For further explanation, therefore, FIG. 9 sets forth a flow chart illustrating a further exemplary method for administering an epoch initiated for remote memory access according to the present invention in which the data transfer is effected using a put operation. The example of FIG. 9 includes an origin compute node (600) and a target compute node (601). The origin compute node (600) of FIG. 9 has installed upon it an origin application messaging module (160), and the target compute node (601) of FIG. 9 has installed upon it a target application messaging module (160). In the example of FIG. 9, each application messaging module (160 and 608) is capable of carry out the method for administering an epoch initiated for remote memory access according to the present invention.

The method of FIG. 9 includes initiating (700), by the origin messaging module (160), an epoch (712) for remote memory access. The origin messaging module (160) initiates (700) the epoch (712) for remote memory access according to the method of FIG. 9 in response to receiving a request from an application on the origin compute node (600) through an API exposed by the origin messaging module (160). Through the API, the application may provide the origin messaging module (160) with an identifier for the epoch (712), which the origin messaging module (160) combines with the rank of the origin compute node (600) to uniquely identify the epoch (712) in the operational group for the compute nodes (600 and 601). In addition to providing an epoch identifier, the application also provides the origin messaging module (160) with the rank of the target compute node (601) included in the epoch (712). In the method of FIG. 9, the origin messaging module (160) may initiate (700) an epoch (712) for remote memory access by sending an epoch initialization message to the target compute node (601) that instructs the target compute node (601) to place access limitations on the target compute node's memory.

The method of FIG. 9 also includes initiating (702), by an origin application messaging module (160) on an origin compute node (600), one or more data transfers (701) to a target compute node (601) for the epoch (712). Readers will note that FIG. 9 only illustrates one data transfer for explanation and clarity. However, any number of data transfers may be initiated before initiating the closing stage (714) for the epoch (712) according to embodiments of the present invention. The data transfer (701) of FIG. 9 transfers data stored on the origin compute node (600) to the target compute node (601). In the example of FIG. 9, the data transfer (701) is effected using a put operation (908). The origin application messaging module (160) may initiate (702) the transfer (701) to a target compute node (601) for the epoch (712) according to the method of FIG. 9 by invoking a direct put operation that specifies the location on the target compute node (601) where the data is to be stored. Upon invoking a direct put operation, a DMA engine on the origin compute node (600) begins the data transfer (701) by reading the data from storage on the origin compute node (600), packetizing the data into network packets and transmitting the data through a data communication network to the DMA engine of the target compute node (601).

In the method of FIG. 9, initiating (702), by the origin application messaging module (160) on an origin compute node (600), one or more data transfers (701) to a target compute node (601) for the epoch (712) includes incrementing (900) a put counter (902) upon initiation of the put operation (908) for each data transfer (701). The put counter (902) of FIG. 9 is a counter that keeps track of how many data transfers the origin compute node has initiated for the epoch (712). In the example of FIG. 9, the put counter (902) keeps track of how many data transfers the origin compute node has initiated for the epoch (712) using a value (904).

The method of FIG. 9 also includes initiating (716), by the origin application messaging module (160) after initiating the data transfers (701), a closing stage (714) for the epoch (712), including rejecting any new data transfers after initiating the closing stage (714) for the epoch (712). As mentioned above, the closing stage (714) of the epoch (712) is the last portion of the epoch (712) during which no new data transfers are initiated for the epoch (712). The closing stage (714) of the epoch (712) advantageously provides a period of time at the end of the epoch (712) to allow any data transfers currently in progress to complete before the epoch (712) is closed. In the method of FIG. 9, the origin application messaging module (160) initiates (716) the closing stage (714) for the epoch (712) before the data transfer (701) is complete.

Initiating (716), by the origin application messaging module (160) after initiating the data transfers (701), a closing stage (714) for the epoch (712) according to the method of FIG. 9 includes sending (906) a value (904) of the put counter (902) to the target compute node (601). The origin application messaging module (160) may send (906) a value (904) of the put counter (902) to the target compute node (601) according to the method of FIG. 9 by encapsulating the value (904) of the put counter (902) in a message and transmitting the message to the target compute node (601).

The method of FIG. 9 includes determining (920), by the target application messaging module (608), whether the value (904) of the put counter (902) matches a value (918) of a got counter (916). The got counter (916) of FIG. 9 is a counter that keeps track of how many data transfers have completed on the target compute node (601) for the epoch (712). In the example of FIG. 9, the got counter (916) keeps track of how many data transfers have completed on the target compute node (601) for the epoch (712) using a value (918). If the value (904) of the put counter (902) is the same as the value (918) of the got counter (916), then the value (904) of the put counter (902) matches the value (918) of the got counter (916) and the number of data transfers initiated by the origin compute node (600) matches the number of data transfer completed on the target compute node (601). If the value (904) of the put counter (902) is not the same as the value (918) of the got counter (916), then the value (904) of the put counter (902) does not match the value (918) of the got counter (916) and the number of data transfers initiated by the origin compute node (600) does not match the number of data transfer completed on the target compute node (601), indicating that there are some remaining data transfer that have yet to complete.

The method of FIG. 9 includes waiting (912), by the target application messaging module (608), for completion of the data transfer (701) if the value (904) of the put counter (902) does not match the value (918) of the got counter (916). The target application messaging module (608) may wait (912) for completion of the data transfer (701) according to the method of FIG. 9 by listening for a transfer completion signal from the DMA engine of the target compute node (601) indicating that a data transfer for the epoch (712) is complete.

The method of FIG. 9 includes incrementing (914), by a target application messaging module (608) on the target compute node (601), a got counter (916) upon completion of each put operation (908). The target application messaging module (608) may increment (914) the got counter (916) upon completion of each put operation (908) according to the method of FIG. 9 after receiving transfer completion signal from the DMA engine of the target compute node (601) indicating that a data transfer for the epoch (712) is complete. After incrementing (914) the got counter (916), the method of FIG. 9 again determines (920) whether the value (904) of the put counter (902) matches a value (918) of a got counter (916) as described above.

The method of FIG. 9 also includes sending (922), by the target application messaging module (608) to the origin application messaging module (160), a completion acknowledgement (910) if the value (904) of the put counter (902) matches the value (918) of the got counter (916). The completion acknowledgement (910) of FIG. 9 indicates that all of the data transfers initiated on the origin compute node (600) have completed on the target compute node (601). The target application messaging module (608) may send (922) the completion acknowledgement (910) to the origin application messaging module (160) according to the method of FIG. 9 by encapsulating the completion acknowledgement (910) in a message and transmitting the message to the origin compute node (600).

The method of FIG. 9 includes determining (718), by the origin application messaging module (160), whether the data transfers (701) have completed. The origin application messaging module (160) may determine (718) whether the data transfers (701) have completed according to the method of FIG. 9 by determining whether the completion acknowledgement has been received in the origin compute node (600). If the completion acknowledgement has been received in the origin compute node (600), then the data transfers (701) have completed because all of the data transfers initiated on the origin compute node (600) have completed on the target compute node (601). If the completion acknowledgement has not been received in the origin compute node (600), then the data transfers (701) have not completed because some of the data transfers initiated on the origin compute node (600) have yet to be completed on the target compute node (601).

The method of FIG. 9 includes closing (724), by the origin application messaging module (160), the epoch (712) if the data transfers (701) have completed. The origin application messaging module (160) may close (724) the epoch (712) according to the method of FIG. 9 by sending an epoch termination message to the target compute node (601) that instructs the target compute node (601) to remove any access limitations on the target compute node's memory and by returning processor control to the origin compute node's application requesting the synchronization with the target compute node (601).

As mentioned above, the application messaging module (160) initiates (716) a closing stage (714) for an epoch (712) before the data transfer (701) is completed. Because there are pending data transfers for the epoch (712) when the closing stage (714) is initiated, the duration of the closing stage (714) is at least as long as the time taken to complete any remaining data transfers and for the origin compute node (600) to receive the completion acknowledgement (910). Upon completion of the remaining data transfers and reception by the origin compute node (600) of the completion acknowledgement (910), the application messaging module (160) of FIG. 9 may close (724) epoch (712).

In FIG. 9, the origin application messaging module initiates a closing stage for an epoch before all of the data transfers initiated for the epoch using a put operation are complete. In some embodiments, however, the origin application messaging module may initiate a closing stage for an epoch using a put operation after all of the data transfers initiated for the epoch are complete. For further explanation, therefore, FIG. 10 sets forth a flow chart illustrating a further exemplary method for administering an epoch initiated for remote memory access according to the present invention in which the origin application messaging module (160) initiates (716) a closing stage (714) for an epoch (712) after the data transfers are complete.

Figure 10:
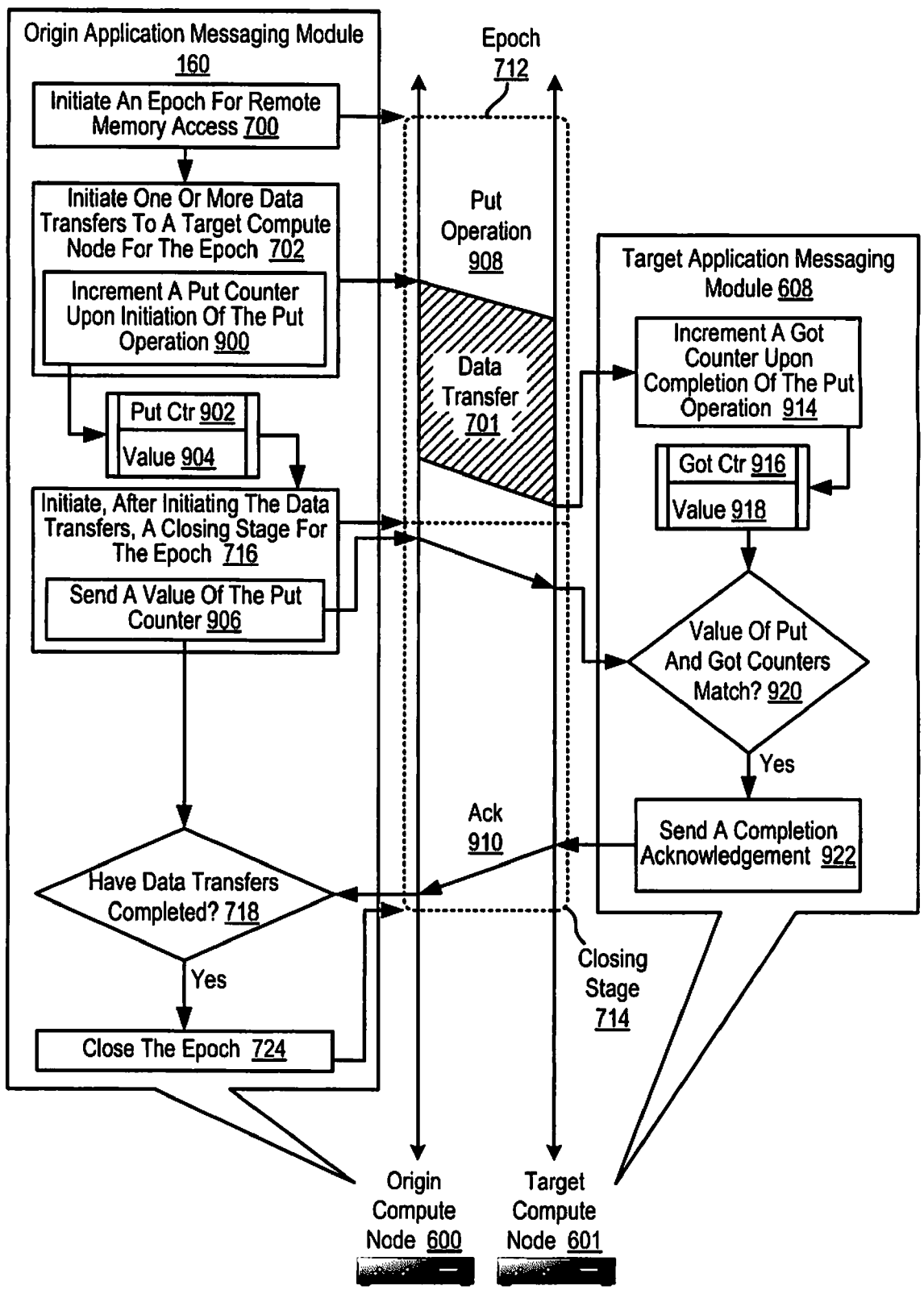
FIG. 10 sets forth a flow chart illustrating a further exemplary method for administering an epoch initiated for remote memory access according to the present invention.

The method of FIG. 10 is similar to the method of FIG. 9. That is, the method of FIG. 10 includes: initiating (700), by the origin messaging module (160), an epoch (712) for remote memory access; initiating (702), by an origin application messaging module (160) on an origin compute node (600), one or more data transfers (701) to a target compute node (601) for the epoch (712), including incrementing (900) a put counter (902) upon initiation of the put operation (908) for each data transfer; incrementing (914), by a target application messaging module (608) on the target compute node (601), a got counter (916) upon completion of each put operation (908); initiating (716), by the origin application messaging module (160) after initiating the data transfers (701), a closing stage (714) for the epoch (712), including rejecting any new data transfers after initiating the closing stage (714) for the epoch (712) and sending (906) a value (904) of the put counter (902) to the target compute node (601); determining (920), by the target application messaging module (608), whether the value (904) of the put counter (902) matches a value (918) of the got counter (916); sending (922), by the target application messaging module (608) to the origin application messaging module (160), a completion acknowledgement (910) if the value (904) of the put counter (902) matches the value (918) of the got counter (916); determining (718), by the origin application messaging module (160), whether the data transfers (701) have completed; and closing (724), by the origin application messaging module (160), the epoch (712) if the data transfers (701) have completed.

As mentioned above, the application messaging module (160) initiates (716) a closing stage (714) for an epoch (712) after the data transfer (701) is completed. Because there are no pending data transfer operations for the epoch (712) when the closing stage (714) is initiated, the duration of the closing stage (714) is at least as long as the period of time required for the value of the put counter (902) to reach the target compute node (601) and have the target compute node return a completion acknowledgement (910) to the origin compute node (600). After receiving the completion acknowledgement (910), the application messaging module (160) may close (724) the epoch (712).

Exemplary embodiments of the present invention are described largely in the context of a fully functional computer system for administering an epoch initiated for remote memory access. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of administering an epoch initiated for remote memory access, the method comprising:
   initiating, by an origin application messaging module on an origin compute node, one or more data transfers to a target compute node for the epoch;
   initiating, by the origin application messaging module after initiating the data transfers, a closing stage for the epoch, including rejecting any new data transfers after initiating the closing stage for the epoch and prior to closing the epoch;
   determining, by the origin application messaging module, whether the data transfers have completed; and
   closing, by the origin application messaging module, the epoch if the data transfers have completed;
   wherein the origin compute node and the target compute node are comprised in a parallel computer, the parallel computer comprising a plurality of compute nodes connected for data communications through a data communications network, the data communications network optimized for point to point data communications.

2. The method of claim 1 wherein initiating, by the origin application messaging module after initiating the data transfers, a closing stage for the epoch further comprises initiating the closing stage for the epoch before the data transfers are complete.

3. The method of claim 1 wherein initiating, by the origin application messaging module after initiating the data transfers, a closing stage for the epoch further comprises initiating the closing stage for the epoch after the data transfers are completed.

4. The method of claim 1 wherein:
   each data transfer is effected using a get operation;
   initiating, by an origin application messaging module on a origin compute node, one or more data transfers to a target compute node for the epoch further comprises incrementing a get counter upon initiation of the get operation for each data transfer;
   the method further comprises decrementing, by the origin application messaging module, the get counter upon completion of each get operation; and
   determining, by the origin application messaging module, whether the data transfers have completed further comprises determining whether a value of the get counter is zero.

5. The method of claim 1 wherein:
   each data transfer is effected using a put operation;
   initiating, by an origin application messaging module on a origin compute node, one or more data transfers to a target compute node for the epoch further comprises incrementing a put counter upon initiation of the put operation for each data transfer;
   the method further comprises incrementing, by a target application messaging module on the target compute node, a got counter upon completion of each put operation;
   initiating, by the origin application messaging module after initiating the data transfers, a closing stage for the epoch further comprises sending a value of the put counter to the target compute node;

the method further comprises:
determining, by the target application messaging module, whether the value of the put counter matches a value of the got counter, and
sending, by the target application messaging module to the origin application messaging module, a completion acknowledgement if the value of the put counter matches the value of the got counter; and
determining, by the origin application messaging module, whether the data transfers have completed further comprises determining whether the completion acknowledgement has been received in the origin compute node.

6. A system capable of administering an epoch initiated for remote memory access, the system comprising one or more computer processors, computer memory operatively coupled to the computer processors, the computer memory having disposed within it computer program instructions capable of:
initiating, by an origin application messaging module on an origin compute node, one or more data transfers to a target compute node for the epoch;
initiating, by the origin application messaging module after initiating the data transfers, a closing stage for the epoch, including rejecting any new data transfers after initiating the closing stage for the epoch and prior to closing the epoch;
determining, by the origin application messaging module, whether the data transfers have completed; and
closing, by the origin application messaging module, the epoch if the data transfers have completed;
wherein the origin compute node and the target compute node are comprised in a parallel computer, the parallel computer comprising a plurality of compute nodes connected for data communications through a data communications network, the data communications network optimized for point to point data communications.

7. The system of claim 6 wherein initiating, by the origin application messaging module after initiating the data transfers, a closing stage for the epoch further comprises initiating the closing stage for the epoch before the data transfers are complete.

8. The system of claim 6 wherein initiating, by the origin application messaging module after initiating the data transfers, a closing stage for the epoch further comprises initiating the closing stage for the epoch after the data transfers are completed.

9. The system of claim 6 wherein:
each data transfer is effected using a get operation;
initiating, by an origin application messaging module on a origin compute node, one or more data transfers to a target compute node for the epoch further comprises incrementing a get counter upon initiation of the get operation for each data transfer;
the computer memory also has disposed within it computer program instructions capable of decrementing, by the origin application messaging module, the get counter upon completion of each get operation; and
determining, by the origin application messaging module, whether the data transfers have completed further comprises determining whether a value of the get counter is zero.

10. The system of claim 6 wherein:
each data transfer is effected using a put operation;
initiating, by an origin application messaging module on a origin compute node, one or more data transfers to a target compute node for the epoch further comprises incrementing a put counter upon initiation of the put operation for each data transfer;
the computer memory also has disposed within it computer program instructions capable of incrementing, by a target application messaging module on the target compute node, a got counter upon completion of each put operation;
initiating, by the origin application messaging module after initiating the data transfers, a closing stage for the epoch further comprises sending a value of the put counter to the target compute node;
the computer memory also has disposed within it computer program instructions capable of:
determining, by the target application messaging module, whether the value of the put counter matches a value of the got counter, and
sending, by the target application messaging module to the origin application messaging module, a completion acknowledgement if the value of the put counter matches the value of the got counter; and
determining, by the origin application messaging module, whether the data transfers have completed further comprises determining whether the completion acknowledgement has been received in the origin compute node.

11. A computer program product for administering an epoch initiated for remote memory access, the computer program product comprising a computer readable non-transmission medium, the computer readable non-transmission medium comprising computer program instructions capable of:
initiating, by an origin application messaging module on an origin compute node, one or more data transfers to a target compute node for the epoch;
initiating, by the origin application messaging module after initiating the data transfers, a closing stage for the epoch, including rejecting any new data transfers after initiating the closing stage for the epoch and prior to closing the epoch;
determining, by the origin application messaging module, whether the data transfers have completed; and
closing, by the origin application messaging module, the epoch if the data transfers have completed;
wherein the origin compute node and the target compute node are comprised in a parallel computer, the parallel computer comprising a plurality of compute nodes connected for data communications through a data communications network, the data communications network optimized for point to point data communications.

12. The computer program product of claim 11 wherein initiating, by the origin application messaging module after initiating the data transfers, a closing stage for the epoch further comprises initiating the closing stage for the epoch before the data transfers are complete.

13. The computer program product of claim 11 wherein initiating, by the origin application messaging module after initiating the data transfers, a closing stage for the epoch further comprises initiating the closing stage for the epoch after the data transfers are completed.

14. The computer program product of claim 11 wherein:
each data transfer is effected using a get operation;
initiating, by an origin application messaging module on a origin compute node, one or more data transfers to a target compute node for the epoch further comprises incrementing a get counter upon initiation of the get operation for each data transfer;
the computer program product further comprises computer program instructions capable of decrementing, by the origin application messaging module, the get counter upon completion of each get operation; and determining, by the origin application messaging module, whether the data transfers have completed further comprises determining whether a value of the get counter is zero.

15. The computer program product of claim 11 wherein:

each data transfer is effected using a put operation;

initiating, by an origin application messaging module on a origin compute node, one or more data transfers to a target compute node for the epoch further comprises incrementing a put counter upon initiation of the put operation for each data transfer;

the computer program product further comprises computer program instructions capable of incrementing, by a target application messaging module on the target compute node, a got counter upon completion of each put operation;

initiating, by the origin application messaging module after initiating the data transfers, a closing stage for the epoch further comprises sending a value of the put counter to the target compute node;

the computer program product further comprises computer program instructions capable of:

determining, by the target application messaging module, whether the value of the put counter matches a value of the got counter, and sending, by the target application messaging module to the origin application messaging module, a completion acknowledgement if the value of the put counter matches the value of the got counter; and determining, by the origin application messaging module, whether the data transfers have completed further comprises determining whether the completion acknowledgement has been received in the origin compute node.

\* \* \* \* \*